US010867340B1

(12) United States Patent
Gauvin et al.

(10) Patent No.: US 10,867,340 B1
(45) Date of Patent: Dec. 15, 2020

(54) SYSTEMS AND METHODS FOR GENERATING PRICE COMPARISONS

(71) Applicant: Capital One Services, LLC, McLean, VA (US)

(72) Inventors: Adam Gauvin, Austin, TX (US); Adam Zacharski, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/799,429

(22) Filed: Feb. 24, 2020

(51) Int. Cl.
*G06Q 30/00* (2012.01)
*G06Q 30/06* (2012.01)
*G06Q 10/08* (2012.01)
*H04W 4/14* (2009.01)
*G06N 20/00* (2019.01)
*G06N 5/04* (2006.01)
*G06Q 30/02* (2012.01)

(52) U.S. Cl.
CPC .......... *G06Q 30/0631* (2013.01); *G06N 5/04* (2013.01); *G06N 20/00* (2019.01); *G06Q 10/087* (2013.01); *G06Q 30/0206* (2013.01); *H04W 4/14* (2013.01)

(58) Field of Classification Search
CPC ...................................................... G06Q 30/00
See application file for complete search history.

(56) References Cited

U.S. PATENT DOCUMENTS

| 2006/0167790 | A1 | 7/2006 | Gould et al. | |
| 2009/0128335 | A1* | 5/2009 | Leung | G06Q 30/0601 340/572.1 |
| 2012/0123910 | A1* | 5/2012 | George | G06Q 30/0641 705/27.1 |
| 2012/0303412 | A1* | 11/2012 | Etzioni | G06Q 30/06 705/7.31 |

FOREIGN PATENT DOCUMENTS

AU   2005100732 A4   10/2005

OTHER PUBLICATIONS

Deng, Houtao, "Recommender System in Practice: How companies make product recommendations", Towards data science, dated Feb. 13, 2019. (Year: 2019).*
Jun Woo, Kim et al., "Price Comp-arisons on the Internet Based on Computational Intelligence", NCBI Resources, dated: Sep. 30, 2014 (Year: 2014).*

* cited by examiner

*Primary Examiner* — Mark A Fadok
(74) *Attorney, Agent, or Firm* — Bookoff McAndrews, PLLC

(57) ABSTRACT

A computer-implemented method for generating price comparisons in an electronic conversation may include: receiving first data from a mobile device including an identifier of a product; determining an identification of the product; using a machine-learning model, determining a matching product, the machine-learning model being trained to learn associations between products based on (i) product identification numbers, (ii) vectorizations of parameters of products, and (Continued)

(iii) social information data; identifying an offer for a matching product; extracting second data from the offer that includes a price and third data configured to enable access to the offer; determining a lowest price offer from amongst identified offers; generating fourth data that includes (i) information indicative of the lowest price offer, and (ii) fifth data configured to enable access to at least one of the respective third data corresponding to the lowest price offer or the second data; and transmitting the fourth data to the mobile device.

18 Claims, 5 Drawing Sheets

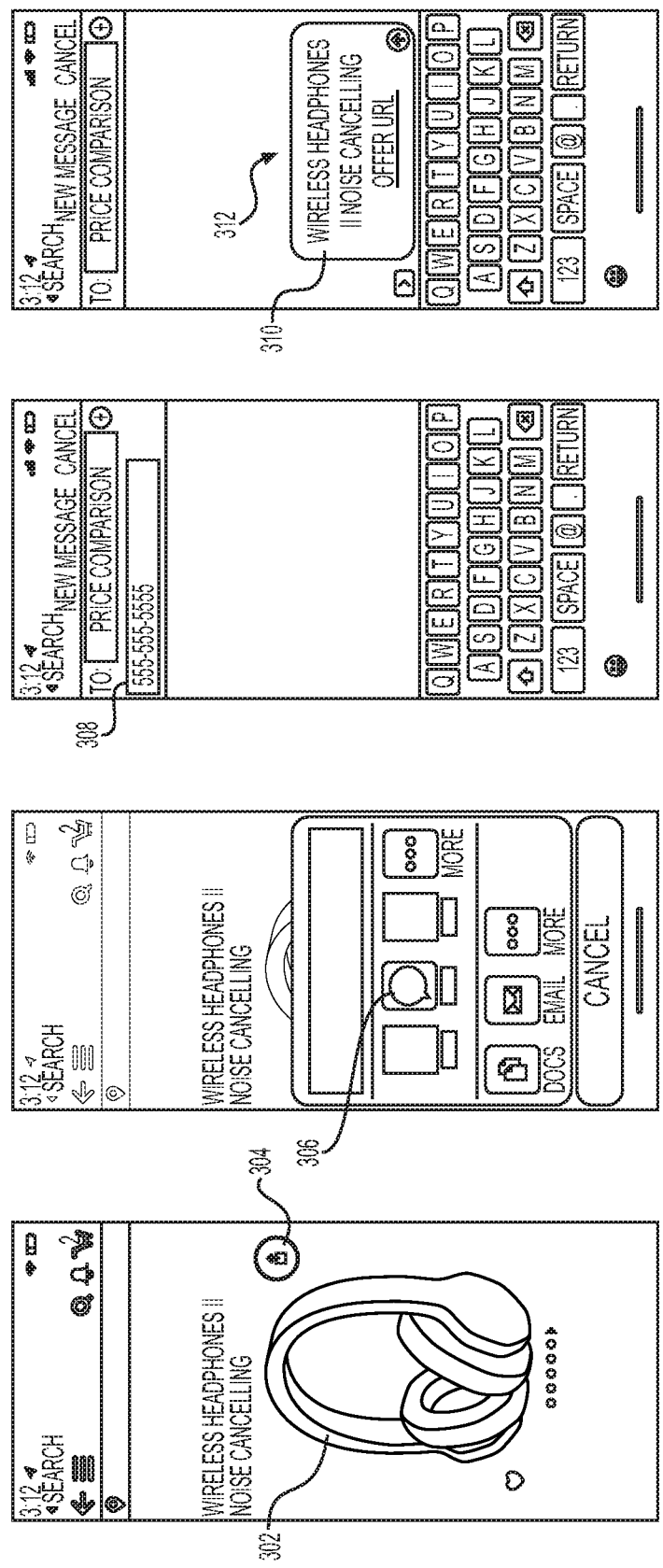

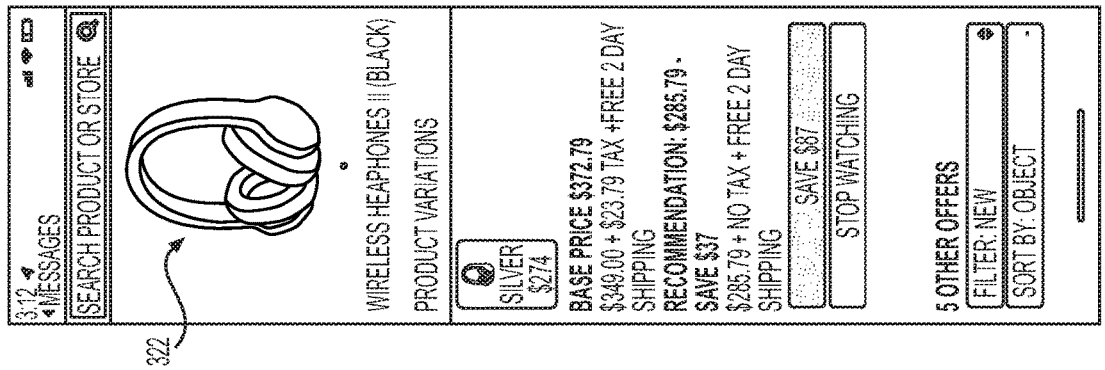
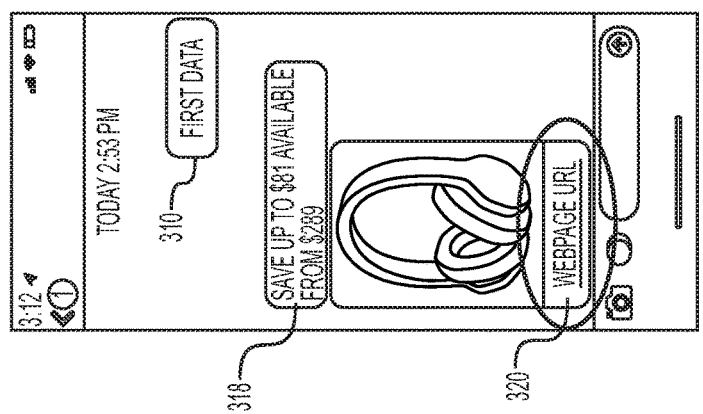
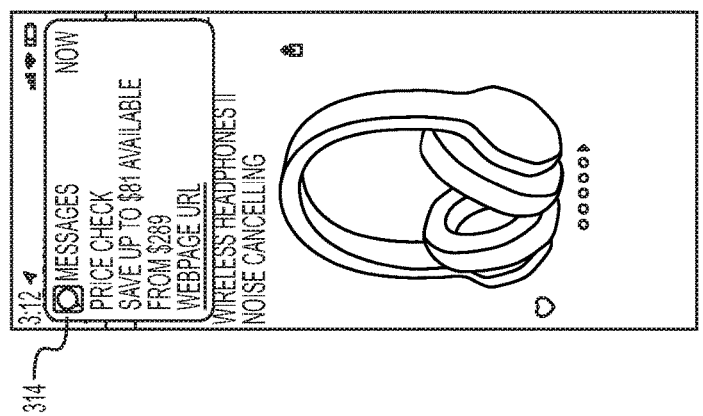
*FIG. 3E*
*FIG. 3F*
*FIG. 3G*

US 10,867,340 B1

SYSTEMS AND METHODS FOR GENERATING PRICE COMPARISONS

TECHNICAL FIELD

Various embodiments of the present disclosure relate generally to generating a price comparison for a product, and relate particularly to methods and systems for interacting with a user over a text messaging channel of a telecommunications network to receive information on a product, and provide price comparison information for the product to the user.

BACKGROUND

When searching for a product, customers may attempt to comparison shop between different vendors to find a lowest price. However, different vendors may list matching products with different identifications or descriptions, and hinder the ability of conventional comparison shopping tools to make comparisons. Additionally, conventional electronic comparison shopping tools generally operate in a manner that interrupts the customer's product search interaction. For example, a customer seeking to comparison shop at a physical store may need to interrupt their product search to access an electronic device. Similarly, a customer searching for a product on an e-commerce platform may need to switch to a different website page or app or the like to comparison shop before returning to their purchase.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for generating price comparisons, e.g., within in an electronic conversation. Each of the examples disclosed herein may include one or more of the features described in connection with any of the other disclosed examples.

In one example, a computer-implemented method may include: receiving first data from a mobile device, the first data including one or more identifiers associated with a product; determining an identification of the product based on the first data; using a machine-learning model, determining one or more products that match the identification, the machine-learning model being trained to learn associations between products and product identifications based on (i) product identification numbers, (ii) vectorizations of parameters of the one or more products, and (iii) social information data associated with the products; identifying, over the electronic network, one or more offers for sale of the determined one or more products that match the identification of the product; extracting second data from the one or more identified offers that includes a respective price for each offer and respective third data configured to enable access to the offer over the electronic network; determining a lowest price offer from amongst the one or more identified offers based on the second data; generating fourth data that includes one or more of (i) information indicative of the lowest price offer, (ii) at least a portion of the second data having the third data corresponding to the lowest price offer, or (iii) fifth data configured to enable access to the at least portion of the second data; and transmitting the fourth data to the mobile device.

In another example, a system may include a processor, and a memory storing: a machine learning model configured to determine one or more products that match an identification of a product, the machine-learning model being trained to learn associations between products and product identifications based on (i) product identification numbers, (ii) vectorizations of parameters of the one or more products, and (iii) social information data associated with the products; and instructions that, when executed by the processor, cause the processor to perform operations that include: receiving first data from a mobile device, the first data including one or more identifiers associated with a product; determining the identification of the product based on the first data; using the machine-learning model, determining one or more products that match the identification; identifying, over the electronic network, one or more offers for sale of the determined one or more products that match the identification of the product; extracting second data from the one or more identified offers that includes a respective price for each offer and respective third data configured to enable access to each offer over the electronic network; determining a lowest price offer from amongst the one or more identified offers based on the second data; generating fourth data that includes one or more of (i) information indicative of the lowest price offer, (ii) at least a portion of the second data having the third data corresponding to the lowest price offer, or (iii) fifth data configured to enable access to the at least portion of the second data; and transmitting the fourth data to the mobile device.

In a further example, a computer-implemented method may include: receiving first data from a mobile device via a telecommunications network, the first data including one or more identifiers associated with a product; determining an identification of the product based on the first data, wherein the determining of the identification of the product based on the first data includes one or more of: performing a content analysis process on the first data; or using the first data to access an offer for sale of the product, and extracting information associated with the product; using a machine-learning model, determining one or more products that match the identification, the machine-learning model being trained to learn associations between products and product identifications based on (i) product identification numbers, (ii) vectorizations of parameters of the one or more products, and (iii) social information data associated with the products; identifying, over the electronic network, one or more offers for sale of the determined one or more products that match the identification of the product; extracting second data from the one or more identified offers that includes a respective price for each offer and respective third data configured to enable access to each offer over the electronic network; determining a lowest price offer from amongst the one or more identified offers based on the second data; generating fourth data that includes one or more of (i) information indicative of the lowest price offer, (ii) at least a portion of the second data having the third data corresponding to the lowest price offer, or (iii) fifth data configured to enable access to the at least portion of the second data; and transmitting the fourth data to the mobile device via the telecommunications network.

In another example, a computer-implemented method may include: receiving, via a text messaging channel of a telecommunications network, first data from a mobile device, the first data including one or more identifiers associated with a product; determining an identification of the product based on the first data; providing the identification of the product to an application programming interface ("API") of an offer finder system, the offer finder system configured to identify, over an electronic network, one or more offers for sale of one or more products that match the identification of the product from one or more vendors; extracting second data from the one or more identified offers that includes a respective price for each offer and respective third data configured to enable access to each offer over the electronic network; determining a lowest price offer from amongst the one or more identified offers based on the second data; dynamically generating a website page configured to display information associated with one or more of the second data and the lowest price offer; generating fourth data that includes one or more of: (i) information indicative of the lowest price offer, (ii) a selectable uniform resource locator ("URL") associated with the dynamically generated website page or (iii) at least a portion of the second data having the third data corresponding to the lowest price offer; and transmitting the fourth data to the mobile device via the text messaging channel.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3G depict a mobile device engaging in an electronic conversation for price comparisons via the method of FIG. 2.

DETAILED DESCRIPTION OF EMBODIMENTS

Figure 1:
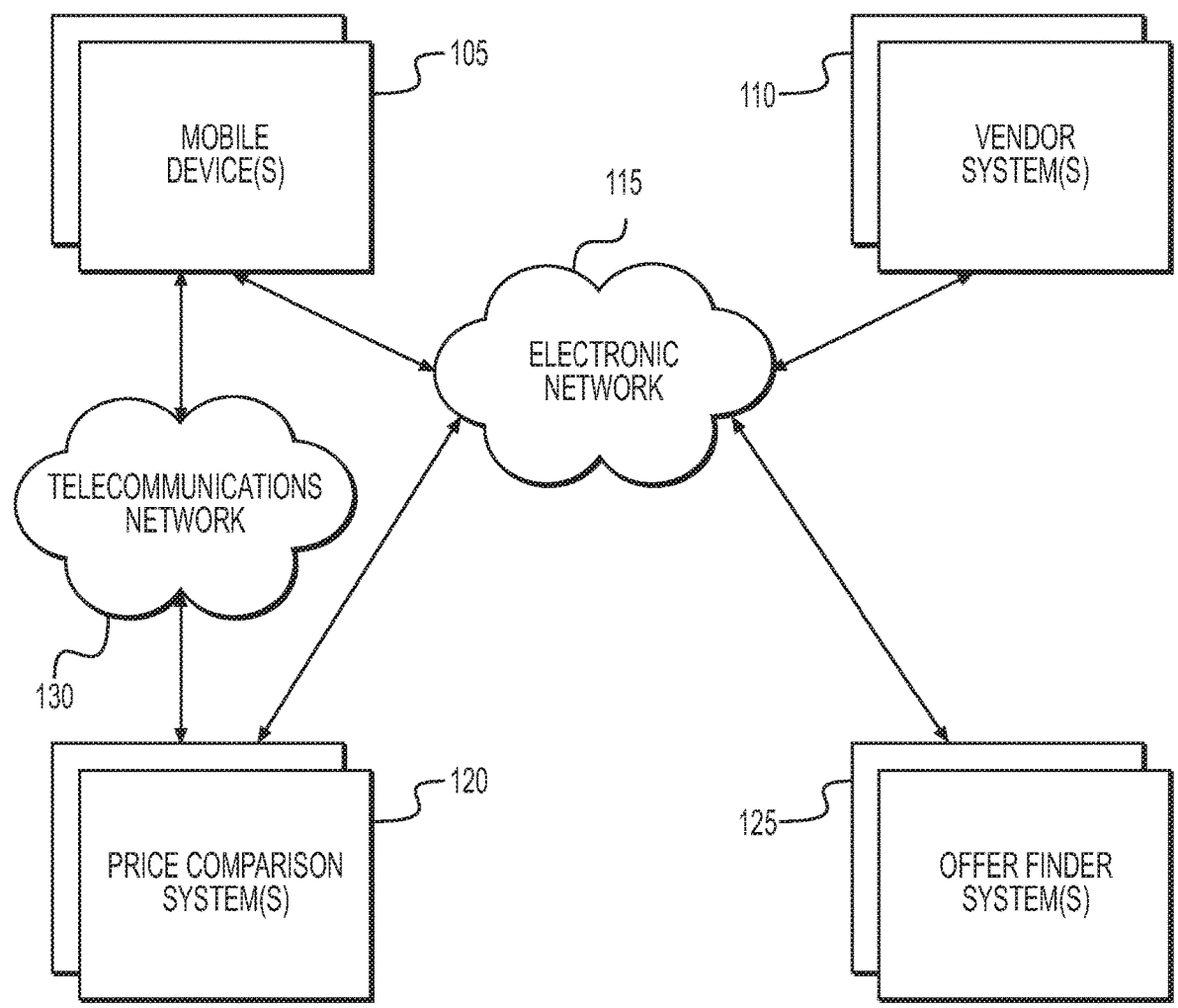
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

As used herein, the term "dealer" may indicate, and may be used interchangeably with, a seller of items or services, a vendor of items or services, etc. The term "client" may indicate, and may be used interchangeably with, a customer, buyer, person attempting to obtain a lease, ownership, ownership share, etc., of an item and/or service.

In general, the present disclosure provides methods and systems for using machine learning techniques to generate a price comparison for a product, e.g., within an electronic conversation. The term "product" as used herein may refer to goods, services, property, rights, other things of value that may be transferred, or combinations thereof. As will be discussed below in more detail, in methods and systems according to the present disclosure, existing techniques may be improved.

When seeking to purchase a product, a customer may be wary that the purchase price is reasonable. From a different viewpoint, a customer may be wary of making a purchase at a particular price from a first vendor, only to find later that another price offered by a second vendor is lower or includes other benefits or promotions. This wariness may result in a barrier to entry that chills the customer's willingness to make purchases. Conversely, if a customer feels that a particular offer from a vendor is a good deal, i.e., a price lower than the average price for the product and/or includes terms or benefits not available to all consumers, that information may act as an incentive that increases the customer's willingness to make the purchase.

Thus, the customer's willingness to proceed with a purchase and the potential barrier to entry for the purchase may be influenced by the customer's impression of the amount of price information in the customer's possession. Beyond the customer individually searching for price information from different vendors, tools have been developed to assist the customer with retrieving price information. Such "comparison shopping" tools generally receive a product name or type from a customer, perform a search using the received information to form a search query, e.g., via an automated search tool, and return matching products and/or price information.

However, different vendors may list matching products with different identifications or descriptions, and hinder the ability of conventional comparison shopping tools to make comparisons. Additionally, conventional electronic comparison shopping tools generally operate in a manner that may negatively impact the customer's shopping experience. For example, conventional comparison shopping tools generally require a customer to perform a search and/or interpret the results of the search, which may be time consuming and disruptive to the customer's shopping experience.

Accordingly, a need exists to improve the identification of matching products sold by various vendors. A need also exists to improve how price comparison information is conveyed to a customer without interrupting a shopping experience.

FIG. 1 depicts an exemplary client-server environment that may be utilized with techniques presented herein. One or more mobile device(s) 105 and/or one or more vendor system(s) 110 may communicate across an electronic network 115. The systems of FIG. 1 may communicate in any arrangement. The mobile device 105 may be associated with a customer, e.g., a customer seeking to purchase a product and/or find price comparison information about the product.

As will be discussed herein, one or more price comparison system(s) 120 and/or offer finder system(s) 125 may communicate with each other and/or with the mobile device 105 and/or the vendor system 110 over the electronic network 115 in executing a machine learning model to identify a product, find other products that match the product, retrieve comparison shopping information for the product, and provide the comparison shopping information and/or shopping recommendations. As used herein, a "machine learning model" may include data (e.g., product data, vendor data, or historical customer data) or instruction(s) for generating, retrieving, and/or analyzing such data. In some embodiments, the price comparison system 120 may communicate with the mobile device 105 over a telecommunications network 130, e.g., via a text messaging channel of the telecommunications network 130.

In various embodiments, the electronic network 115 may be a wide area network ("WAN"), a local area network ("LAN"), personal area network ("PAN"), or the like. In some embodiments, electronic network 115 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

In various embodiments, the telecommunications network 130 may be a telephone network, cellular network, or the like, or combinations thereof. In some embodiments, the text messaging channel is embedded into, linked with, or configured to operate in conjunction with an electronic application operating on the mobile device 105 and/or on the electronic network 115.

While FIG. 1 depicts the various systems as physically separate and communicating across network 115 and/or network 130, in various embodiments features of certain systems, such as the price comparison system 120 and offer finder system 125, may be incorporated partially or completely into any of the other systems of FIG. 1. For example, price comparison system 120 may be incorporated by the vendor system 110 and/or the mobile device 105. Some or all of the functionality of the machine learning model may be incorporated into the mobile device 105. For example, some or all of the functionality of the price comparison system 120 may be incorporated into a text messaging application, an internet browser extension, or website page usable by a customer.

Figure 2:
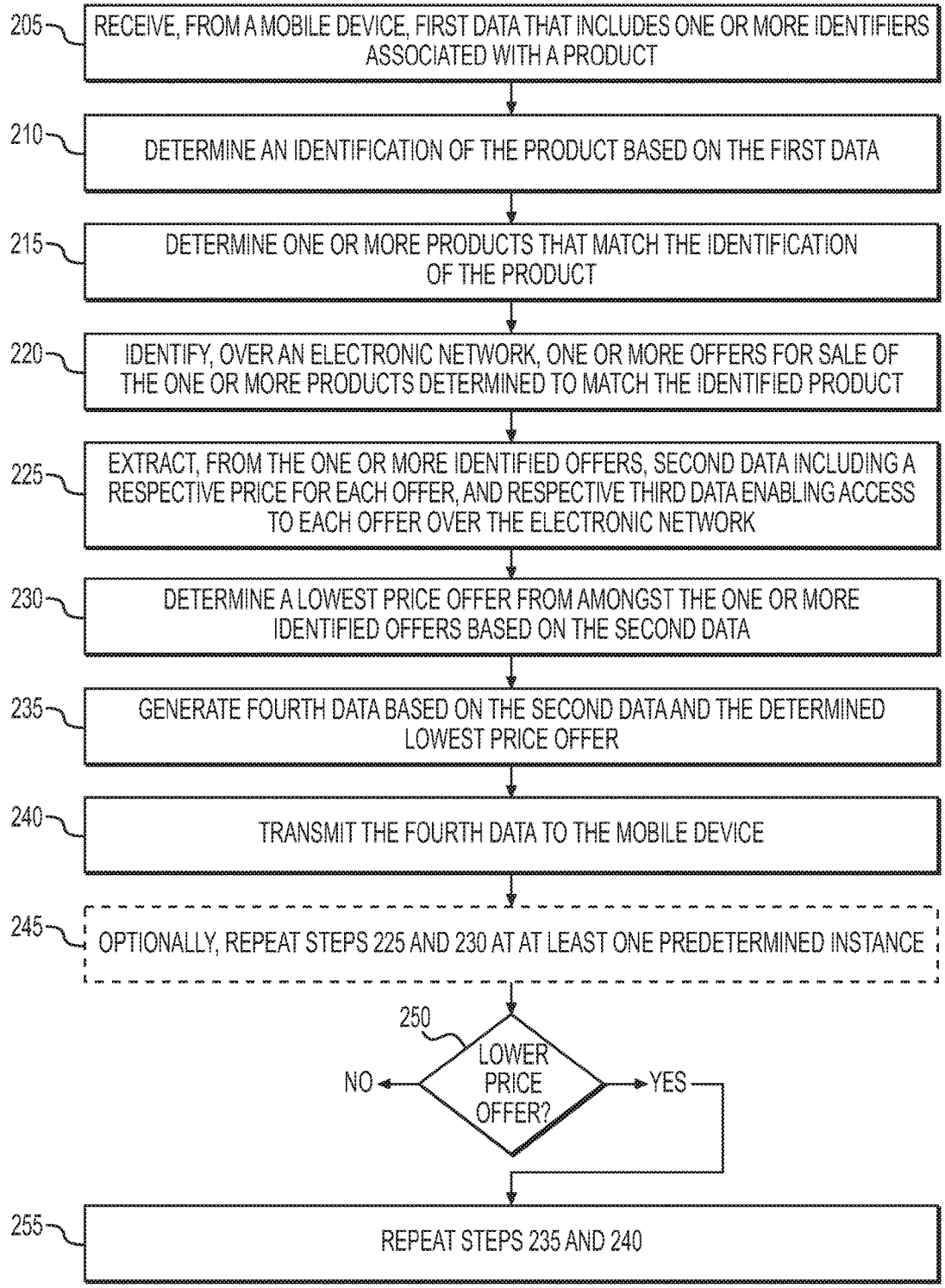
FIG. 2 depicts an exemplary process for generating price comparisons in an electronic conversation.

FIG. 2 illustrates an exemplary process for generating comparison shopping information, e.g., in an electronic conversation. At step 205, the price comparison system 120 may receive first data from the mobile device 105, whereby the first data may include one or more identifiers associated with a product. An "identifier" may include information associated with and/or usable to identify a particular product, e.g., name, identification number, product parameters, descriptive text, images, or the like. In some embodiments, an identifier includes a Uniform Resource Locator ("URL"), e.g., a URL that enables access to an offer for sale of the product and/or information about the product over the electronic network 115. Any acceptable type of an identifier is usable. Other examples include audio data with the customer's speech describing the product, advertising or promotional information, incentives or offers for the product, or other information associated with the product.

In some embodiments, the first data is received via the electronic network 115. In some embodiments, the first data is received via the telecommunications network 130. In some embodiments, the first data is received via a communication channel operating over the electronic network 115 and/or the telecommunications network 130 that is embedded within, or operates in conjunction with, an electronic application, e.g., a text messaging application, an e-commerce application, a social media application, or the like.

In a first exemplary use case, a customer is at a physical store, and wants information on whether an offered price for a product at the store is a lowest option. The customer takes a picture of at least a portion of the product, a product label, in-store label, barcode associated with the product, or other information indicative of an identification of the product, e.g., with a mobile device 105 associated with the customer, and transmits the picture to a contact and/or telephone number associated with the price comparison system 120. In another exemplary use case, instead of taking a picture, the customer transmits a textual message to the contact and/or telephone number that includes a name and/or description of the product. The transmitted picture, textual message, or the like is included in the first data transmitted to the price comparison system 120.

In a further exemplary use case, the customer is searching for a product using an e-commerce application executed by the mobile device 105. The customer transmits a URL or the like to the contact and/or phone number. For instance, in some cases, e-commerce applications are configured to "share" listing for products, whereby a user is provided with a URL or other identifier that enables another user to access the product on another device associated with the other user. In some instances, such as where the customer is shopping using a website page or the like, a URL associated with the website page is accessible to the user. The transmitted URL or other data is included in the first data transmitted to the price comparison system 120.

In some embodiments, such as where the customer transmits an identifier via the telecommunications network 130 or via an electronic application, the customer may initiate or already be engaged in an electronic conversation. As used herein, an "electronic conversation" includes an environment in which information is able to be passed back and forth between two or more parties over an electronic medium such as the electronic network 115 and/or the telecommunications network 130. In some embodiments, the customer initiates or is engaged with an electronic conversation with a fictitious person, i.e., an artificial conversant or a "bot", that is configured to interact with the customer to make purchases, provide access to offers to purchase products, provide product information, and/or provide comparison shopping information. The fictitious conversant may be a conversational AI bot configured to respond to and generate dialogue for conversing with the user, which may utilize a text messaging channel or other application on the mobile device.

At step 210, the price comparison system 120 may determine an identification of the product based on the first data. In some embodiments, the determination of the identification of the product includes performing a content analysis process on the first data. Any acceptable content analysis process may be used. In some embodiments, the price comparison system 120 may determine a type of content in the first data, and may select a particular content analysis process based on the determined content type. In some embodiments, the content analysis process includes parsing the URL for information about the product, such as a product name and/or product identification number, or the like. In some embodiments, the content analysis process includes parsing text included in the first data. In some embodiments, the content analysis process includes deploying an image processing technique to identify the product based on a received picture, a human speech analysis process to identify the product based on received audio data, deploying a barcode parsing process to identify the product based on a barcode, or the like.

In some embodiments, such as when the first data includes a URL or the like, determining the identification of the product includes using the first data to access a website page corresponding to the URL, e.g., an offer for sale of the product or an informational page about the product, and extracting information associated with the product from the website page. In some embodiments, the price comparison system 120 uses the first data to access the website page corresponding to the URL in response to a determination that the URL included in the first data does not contain unique identifying information associated with the product.

In some embodiments, the price comparison system 120 determines the identification of the product by interacting with another system. In some embodiments, the price comparison system 120 provides the other system with the first data, e.g., via an Application Programming Interface ("API"). In some embodiments, the price comparison system 120 determines that the other system is configured to parse that type of data to identify a product. In some embodiments, the price comparison system 120 accesses a database of product information or the like, and the determination of the identification of the product is based on the product information in the database.

In some embodiments, the price comparison system 120 performs a combination of identification processes. For example, in some embodiments, the price comparison system 120 deploys a human speech analysis process to determine a first at least partial identification of the product, and deploys an image analysis process to determine a second at least partial identification of the product. In various embodiments, various at least partial identification processes may be used in conjunction with each other. In some embodiments, the price comparison system 120 determines the identification of the product based on one or more partial identifications of the product.

In some embodiments, the identification of the product is only a partial identification of the product. For example, a mobile phone product may have many parameters such as memory size, cost, color, etc., and the price comparison may not be able to identify one or more parameters of the mobile product based on the information in the first data. In some embodiments, the price comparison system 120 accesses a database or the like to determine a best-fit parameter for a parameter not identified in the partial identification of the product. In some embodiments, the price comparison system 120 is configured to include any parameter option for a parameter not identified in a partial identification, or a sub-set of parameter options, e.g., based on a predetermined criteria.

For example, if the mobile phone product is available in a 16 gigabit memory model and a 32 gigabit memory model, and the price comparison system 120 is unable to determine which model is associated with the first data, the price comparison system 120 may determine that the identification applies to both models. In another example, the price comparison system 120 may access a database to determine that the 16 gigabit model has a lower cost, and identify the 16 gigabit model as the product based on the that determination. In a further example, the price comparison system 120 may transmit a message to the mobile device 105 requesting a clarification of the identified product, and determine the identification based on a response to the request received from the mobile device 105.

At step 215, the price comparison system 120 may determine one or more products that match the identification of the product. In some embodiments, the price comparison system 120 determines one or more products that match the identification of the product by providing the first data to the offer finder system 125, e.g., via an API. In some embodiments, the price comparison system 120 deploys a machine learning model configured to determine one or more products that match the identification of the product. Any acceptable machine learning technique may be used. In some embodiments, the machine learning model is trained to learn associations between products, product identifications, and/or product identifiers based on, for example, product identification numbers, vectorizations of parameters of one or more products, and social information data associated with the products.

A vectorization of parameters of one or more products is a technique for storing information about a product in an N-dimensional space, each dimension, i.e., each axis in the N-dimensional space, corresponding to a different potential aspect of a product. In some embodiments, a position along an axis corresponds to a value of the parameter. For example, a price of $200.75 may be expressed as a location at 200.75 along a "price" axis. In some embodiments, a position along an axis corresponds to an index value associated with a quality. For example, different positions along a "color" axis may be indexed to different colors, etc., e.g., with "1", "2", and "3" corresponding to "red", "black-and-white plaid", and "clear", respectively. In some embodiments, one or more axes are quantitative and one or more axes are qualitative. It should be understood that while the vectorization above is described as being stored in an N-dimensional space, any acceptable technique for storing vector information is usable, such as a table, database, or the like.

Such vectorization of product parameters enables different products to be compared based on a distance between the products in the N-dimensional space. In some embodiments, one or more axes in the N-dimensional space is assigned a weight that scales distances along that axes, so as to emphasize or deemphasize differences between products for a parameter corresponding to that axis. In some embodiments, such a weight or weights are assigned by the machine learning model. For example, in an embodiment where values on an axis are indexed to different categories of products, a high weight may be applied to a distance along that axis, since a small change in index is predetermined to a large difference in product parameters. In another example, in an embodiment where values on an axis correspond to shipping speed, a low weight may be applied since a change along that axis is predetermined to have a low impact on the difference in product parameters.

In some embodiments, the machine learning model is used to compare the relative locations of products in the N-dimensional space. In some embodiments, the machine learning model is configured to identify a product as matching the identified product based on whether a distance between the product and the identified product in the N-dimensional space is below a predetermined threshold.

The execution of the machine learning model may include deployment of one or more machine learning techniques, such as linear regression, logistical regression, random forest, gradient boosted machine (GBM), and/or a deep neural network. Supervised or unsupervised training may be employed. For example, unsupervised approaches may include K-means clustering. K-Nearest Neighbors may also be used, which may be supervised or unsupervised. Combinations of K-Nearest Neighbors and an unsupervised cluster technique may also be used.

Any of N parameters associated with a product, e.g., included in the first data received in step 205 (or derived therefrom) may correspond to a dimension in the model. As the machine learning system is trained, parameters that have been successful in comparing products in the past may form clusters in N-dimensional space. When the machine learning model ultimately matches one or more products to the identified product, data from the current identification may be fed to the machine learning system, for example, as an N-dimensional vector. Whatever clusters in the model are closest to the current terms in N-dimensional space, and the parameters for the product associated therewith, may determine whether a particular product is considered a match to the identification. Simpler models may be deployed in parallel for speed. For example, rather than analyze all N parameters for a current product, a small number of predetermined parameters N-X may be fed to a simplified machine learning system to quickly determine if a particular product is relatively similar to the identified product.

Social information data, as used herein, means data associated with various users associated with various products. For example, in some embodiments, social information data includes information about offers for products fulfilled by various users, e.g., users unassociated with the mobile device 105. Such information may include one or more of purchase price, incentives or coupons applied, product parameters, shipping time, vendor reviews, product reviews, or the like. In some embodiments, the social information data includes data such as a URL or the like that enables access to an offer for sale executed by one or more of the various users. In some embodiments, social information data includes comments or other text authored by one or more users on one or more social information website pages, such as product reviews, descriptions, commentary, or the like.

In some embodiments, the social information data is stored in a database, or the like. In some embodiments, the machine learning model, the price comparison system 120, and/or another system deploys an automated process to search and retrieve social information data over the electronic network 115. In some embodiments, the price comparison system 120 or the other system accesses a database of social information websites, e.g., a list of review websites, social medial websites, vendor website, etc. In some embodiments, the price comparison system 120 or the other system utilizes an automated search process configured to find and retrieve URLs or the like for websites likely to have social information data.

In some embodiments, product identification number data and social information data associated with products is integrated into the N-dimensional space along with the vectorization of parameters. In other words, such data may be treated as additional parameters of a product. In some embodiments, the machine learning model parses the product identification number data and social information data to determine parameters of the product or products that is integrated into the N-dimensional space. In some embodiments, the machine learning model includes modules, e.g., a module for product identification numbers, a module for vectorization of parameters, and a module for social information data, and the machine learning model is configured to learn associations based on the various modules.

In some embodiments, the price comparison system 120 may determine that no products match the determined identification of the product. For example, the product may be discontinued, customized, unique, not available or illegal to sell, etc. In some embodiments, in response to determining that no products match the determined identification, the price comparison system 120 is configured to transmit a request to the mobile device for additional product information, and to repeat at least steps 210 and 215 based on a response to the request received from the mobile device 105. In some embodiments, the price comparison system 120 is configured to transmit a message to the mobile device 105 indicating that no price comparison information is available.

At step 220, the price comparison system 120 may identify, over the electronic network 115, one or more offers for sale of the one or more products determined to match the identified product. In some embodiments, the price comparison system 120 transmits the product identification to the offer finder system 125. The offer system 125 is configured to identify, over the electronic network 115, one or more products that match the identified product and/or one or more offers for sale of the identified product or products matching the identified product. In various embodiments, the offer finder system 125 one or more of accesses a database of URLs for websites likely to have offers for products, utilizes an automated search process configured to find websites likely to have offers for sale of products, accesses offers for sale based on the first data, or offers for sale identified via the machine learning model, or the like.

At step 225, the price comparison system 120 may extract second data from the one or more identified offers. In some embodiments, such extraction includes accessing and retrieving data from websites accessible via URLs associated with the one or more identified offers via the electronic network 115. In some embodiments, the price comparison system 120 extracts second data from the one or more identified offers by causing the offer finder system 125 to extract the second data from websites accessible via URLs associated with the one or more identified offers. In some embodiments, the price comparison system 120 deploys the machine learning model to extract the second data.

The second data to be extracted may include a respective price for each offer, and respective third data configured to enable access to each offer over the electronic network 115, e.g., an associated URL. In some embodiments, the second data additionally includes product data associated with the product offered for sale in each offer. For instance, if the product offered for sale is similar enough to the identified product to be a match, but includes one or more non-identical parameters, the second data for an offer for that product may include information associated with the differences between that product and the identified product.

In some embodiments, one or more of the prices for offers in the second data is based on the purchase price of the product and one or more additional factors. Additional factors may include discounts, promotions, taxes, shipping fees, or the like associated with one or more of the offers. In some embodiments, the price comparison system 120 accesses information associated with the customer and/or another system such as the vendor system 110 to determine, for one or more of the identified offers, taxes, shipping fees, or the like, and/or promotions, discounts or memberships associated with the customer. In some embodiments, the price comparison system 120 accesses a database of discounts, and identifies whether one or more of the discounts in the database correspond to any of the identified offers. In some embodiments, the price comparison system 120 is configured to generate a discount for an offer, or cause another system to generate a discount for the offer. In some embodiments, one or more of the discounts or promotions are provided by the price comparison system 120. In some embodiments, one or more of the discounts or promotions are not available via an associated original vendor. In some embodiments, the second data includes a comparison of the price for the one or more identified offers with, and without, the corresponding discounts or promotions.

In some embodiments, the third data for each offer in the second data includes affiliate data. The affiliate data is configured to identify one or more of the price comparison system 120 or an entity associated with the price comparison system 120 to a vendor corresponding to the offer if and when the customer fulfills the offer. In other words, when a customer proceeds with an offer provided by the price comparison system 120, as discussed in further detail below, a vendor associated with the offer will receive the affiliate data identifying the price comparison system 120 and/or an entity associated therewith as a facilitator of the offer.

At step 230, the price comparison system 120 may determine a lowest price offer from amongst the one or more identified offers based on the second data. In some embodiments, the price comparison system 120 determines a ranking for the one or more identified offers based on the second data. In various embodiments, the ranking is based on one or more of price, distance to the identified product in the N-dimensional space or similarity to the identified product, discounts or promotions associated with the one or more identified offers, or other criteria.

At step 235, the price comparison system 120 generates fourth data based on the second data and the determined lowest price offer. In various embodiments, the fourth data includes one or more of (i) an indication and/or other information associated with the lowest price offer, (ii) at least a portion of the second data including the respective third data corresponding to the lowest price offer, e.g., an associated URL or the like, or (iii) fifth data configured to enable access to the at least portion of the second data. In some embodiments, the fifth data is a URL, or the like, configured to enable access to a price comparison website page associated with the customer, as discussed in further detail below.

In some embodiments, the fourth data is in the form of textual data or mixed media data that is transferrable via, for example, the text messaging channel of the telecommunications network 130. In some embodiments, the fourth data includes a first portion in the form of textual data that is configured to enable access to a second portion in a format other than textual data, e.g., via the electronic network 115. In some embodiments, the fourth data is in a form compatible with an electronic application. In some embodiments, the fourth data is in the form of a reply from a fictitious conversant.

In some embodiments, the price comparison system 120 is configured to generate the price comparison website page associated with the customer. In some embodiments, the price comparison system 120 is configured to modify or populate an existing price comparison website page. The price comparison website page may include, for example, data configured to display information associated with the second data. For example, in various embodiments, the data on the price comparison website page may be configured to display one or more of information associated with the lowest price offer, a selectable URL for the lowest price offer configured to enable access to the vendor of the offer, or a selectable URL for the lowest price offer configured to enable access to an affiliate e-commerce platform associated with the price comparison system 120 that is configured to fulfill the offer between the customer and the vendor and/or apply one or more discounts or promotions associated with the offer.

In some embodiments, the data on the price comparison website page is configured to display one or more of information associated with the one or more identified offers, the products associated with the one or more offers, or other information included in the second data. In some embodiments, the data on the price comparison website page is configured to display the one or more identified offers according to the determined ranking of the offers. In some embodiments, the data on the price comparison website page is configured to display selectable URLs for the one or more identified offers based on the associated third data.

In some embodiments, the price comparison website page is embedded within or operates in conjunction with an electronic application, such as an e-commerce application. In some embodiments, the fifth data is configured to cause the mobile device 105 to display a selectable item that, when selected by the customer, causes the mobile device 105 to access an electronic application and provides at least a portion of the second data to the electronic application.

At step 240 the price comparison system 120 transmits the fourth data to the mobile device 105. In some embodiments, the fourth data is transmitted via the electronic network 115. In some embodiments, the fourth data is transmitted via the telecommunications network 130, e.g., via the text messaging channel. In some embodiments, the fourth data is embedded in a communication with an electronic application. Any acceptable transmission technique for the transmitting the fourth data to the mobile device 105 may be used. Transmitting the fourth data via the same communication medium that the first data was received (step 205) may enable providing price comparison information to the customer without interrupting the customer's shopping activities.

In a first use case example, the user receives a text message on the mobile device 105 in response to the customer's transmission of a product identifier (step 205), whereby the text message includes the fourth data. In another use case example, the user receives a response on the mobile device 105 in a conversation with a fictitious conversant, i.e., a bot, whereby the response includes the fourth data.

In some embodiments, the generation of the price comparison website associated with the customer is performed in parallel or in conjunction with one or more of the steps or acts above. For example, in some embodiments, the price comparison system 120 generates the price comparison website page in response to receiving the one or more identifiers associated with the product in step 205. As additional steps are completed, the price comparison system 120 populates the price comparison website page with the fourth data.

In some embodiments, the price comparison system 120 generates a URL for the price comparison website page prior to or in conjunction with the actual generation of the website page. In some embodiments, the price comparison system 120 transmits the fourth data including such URL (step 240) in response to receiving the one or more identifiers associated with the product in step 205, and then performs the other steps and/or the generation of the website page while the transmission of step 240 is in transit and/or while the customer's selection of the URL from such transmission is pending. In some embodiments, the price comparison system 120 transmits the URL for the price comparison website (step 240) prior to, or in conjunction with, the generating of the remainder of the fourth data at step 235. Such operation in parallel or in conjunction with other steps may reduce the perceived time of the customer for the price comparison system 120 to perform the method steps discussed above.

Optionally, at step 245, the extracting of the second data (step 225) and the determining of the lowest price offer (step 230) are repeated at at least one predetermined instance. For example, in some embodiments, steps 225 and 230 are repeated at regular intervals, at a predetermined day or time, or in response to a request from the customer via the mobile device 105. At step 250, the price comparison system 120 may determine whether the lowest price offer from such a repeat at step 245 is lower in price than a preceding lowest price offer. At step 255, in response to the lowest price offer from the repeated step being lower than a preceding lowest price offer, the price comparison system 120 may repeat the generation of the fourth data at step 235 and the transmission of the fourth data to the mobile device 105 at step 240.

FIGS. 3A-3G illustrate an exemplary use case of a display of a mobile device 105 interacting with a price comparison system 120 in the manner discussed above. In FIG. 3A, a user is employing an e-commerce electronic application, and has selected an offer for sale of a product 302. The mobile device 105 is displaying a selectable icon 304 to share the offer. In various embodiments, the selectable icon 304 may be provided by a browser, the e-commerce electronic application, an operating system of the mobile device 105, another electronic application, etc. In FIG. 3B, the user has selected the icon 304, and the e-commerce application has displayed options for sharing the offer, including an icon 306 to share the offer over a text messaging channel of a telecommunications network 130. In FIG. 3C, the customer has selected the icon 306, and has selected a contact telephone number 308 for the price comparison system 120. In FIG. 3D, the mobile device 105 has transmitted first data 310 to the price comparison system 120 that includes identifiers 312 of the product 302. In FIG. 3E, the price comparison system 120 has transmitted fourth data 314 to the mobile device 105 that includes an identified offer for sale of a matching offer and a comparison between the identified offer and the offer from the e-commerce electronic application in FIG. 3A. In FIG. 3E, the fourth data is in the form of a notification that acts as a selectable link to return to the text messaging channel conversation with the price comparison system 120. In FIG. 3F, the customer has selected the selectable notification 314 and, in the text messaging channel conversation, the fourth data includes information 318 associated with a lowest price offer and a selectable URL 320 to a price comparison website page associated with the customer. In FIG. 3G, the customer has selected the URL 320, and the price comparison website page is displaying data 322 associated with the lowest price offer.

Figure 4:
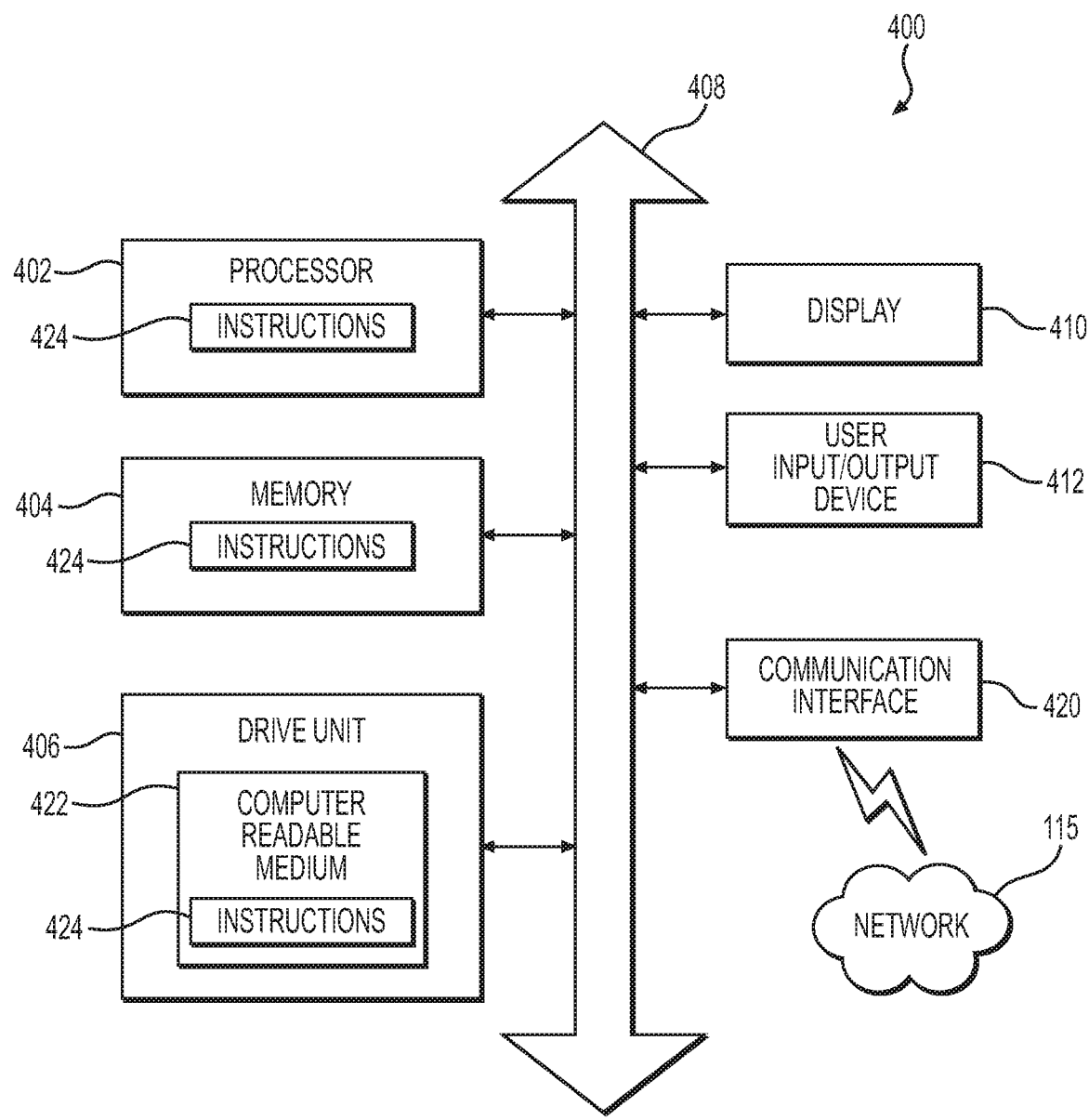
FIG. 4 depicts an example of a computing device, according to aspects of the present disclosure.

FIG. 4 is a simplified functional block diagram of a computer 400 that may be configured as a device for executing the method of FIG. 2, according to exemplary embodiments of the present disclosure. FIG. 4 is a simplified functional block diagram of a computer that may be configured as the price comparison system 120 according to exemplary embodiments of the present disclosure. Specifically, in one embodiment, any of the mobile devices, systems, servers, etc., discussed herein may be an assembly of hardware 400 including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-4, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising:
   receiving first data from a mobile device, the first data including one or more identifiers associated with a product;
   determining an identification of the product based on the first data;
   using a machine-learning model, determining one or more products that match the identification, the machine-learning model being trained to learn associations between products and product identifications based on (i) product identification numbers, (ii) vectorizations of parameters of the one or more products, and (iii) social information data associated with the products;
   identifying, over an electronic network, one or more offers for sale of the determined one or more products that match the identification of the product;
   extracting second data from the one or more identified offers that includes a respective price for each offer and respective third data configured to enable access to each offer over the electronic network;
   determining a lowest price offer from amongst the one or more identified offers based on the second data;
   generating fourth data that includes one or more of (i) information indicative of the lowest price offer, (ii) at least a portion of the second data having the third data corresponding to the lowest price offer, or (iii) fifth data configured to enable access to the at least portion of the second data; and
   transmitting the fourth data to the mobile device;
   wherein the social information data used by the machine learning model to determine the one or more products that match the identification includes:
      a price for at least one fulfilled offer for a product matching the identification by a user unassociated with the mobile device; and
      respective third data configured to enable access to the at least one fulfilled offer.

2. The computer-implemented method of claim 1, wherein:
   the first data is received from the mobile device via a telecommunications network; and
   the fourth data is transmitted to the mobile device via the telecommunications network.

3. The computer-implemented method of claim 1, wherein:
   the first data is received from the mobile device via the electronic network; and
   the fourth data is transmitted to the mobile device via the electronic network.

4. The computer-implemented method of claim 1, wherein:
   the first data is received via an electronic conversation between a user of the mobile device and an artificial conversant; and the fourth data is transmitted to the mobile device via the electronic conversation.

5. The computer-implemented method of claim 1, wherein the determining of the identification of the product based on the first data includes one or more of:
performing a content analysis process on the first data; or
determining that the first data includes data enabling access to an offer for sale of the product, and using the data to access the offer for sale of the product and extract information associated with the product.

6. The computer-implemented method of claim 1, wherein:
extracting second data from the one or more identified offers includes:
accessing a database of discounts and identifying whether one or more discounts in the database correspond to any of the one or more identified offers; and
determining applicable tax and shipping costs for the one or more identified offers; and
the respective prices for the one or more identified offers is based on the discounts and tax and shipping costs corresponding to the one or more identified offers.

7. The computer-implemented method of claim 6, wherein the second data further includes a comparison of the prices of the one or more identified offers with and without the discounts corresponding to the one or more identified offers.

8. The computer-implemented method of claim 1, wherein the respective third data includes affiliate data configured to identify an entity associated with performance of the method to vendors corresponding to the one or more identified offers.

9. The computer-implemented method of claim 1, wherein:
the extracting of second data, and the determining of the lowest price offer are repeated at at least one predetermined instance; and
in response to the lowest price offer for the at least one predetermined instance being lower in price than a price of a preceding lowest price offer, repeating the generating of the fourth data and transmitting of the fourth data to the mobile device.

10. A system, comprising:
a processor; and
a memory storing:
a machine learning model configured to determine one or more products that match an identification of a product, the machine-learning model being trained to learn associations between products and product identifications based on (i) product identification numbers, (ii) vectorizations of parameters of the one or more products, and (iii) social information data associated with the products; and
instructions that, when executed by the processor, cause the processor to perform operations that include:
receiving first data from a mobile device, the first data including one or more identifiers associated with a product;
determining the identification of the product based on the first data;
using the machine-learning model, determining one or more products that match the identification;
identifying, over an electronic network, one or more offers for sale of the determined one or more products that match the identification of the product;
extracting second data from the one or more identified offers that includes a respective price for each offer and respective third data configured to enable access to each offer over the electronic network;
determining a lowest price offer from amongst the one or more identified offers based on the second data;
generating fourth data that includes one or more of (i) information indicative of the lowest price offer, (ii) at least a portion of the second data having the third data corresponding to the lowest price offer, or (iii) fifth data configured to enable access to the at least portion of the second data; and
transmitting the fourth data to the mobile device;
wherein the social information data used by the machine learning model to determine the one or more products that match the identification includes:
a price for at least one fulfilled offer for a product matching the identification by a user unassociated with the mobile device; and
respective third data configured to enable access to the at least one fulfilled offer.

11. The system of claim 10, wherein:
the first data is received from the mobile device via a telecommunications network; and
the fourth data is transmitted to the mobile device via the telecommunications network.

12. The system of claim 10, wherein:
the first data is received via an electronic conversation between a user of the mobile device and an artificial conversant; and
the fourth data is transmitted to the mobile device via the electronic conversation.

13. The system of claim 10, wherein the determining of the identification of the product based on the first data includes one or more of:
performing a content analysis process on the first data; or
determining that the first data includes data enabling access to an offer for sale of the product, and using the data to access the offer for sale of the product and extract information associated with the product.

14. The system of claim 10, wherein:
extracting second data from the one or more identified offers includes:
accessing a database of discounts and identifying whether one or more discounts in the database correspond to any of the one or more identified offers; and
determining applicable tax and shipping costs for the one or more identified offers; and
the respective prices for the one or more identified offers is based on the discounts and tax and shipping costs corresponding to the one or more identified offers.

15. The system of claim 14, wherein the second data further includes a comparison of the prices of the one or more identified offers with and without the discounts corresponding to the one or more identified offers.

16. The system of claim 10, wherein the respective third data includes affiliate data configured to identify an entity associated with performance of the method to vendors corresponding to the one or more identified offers.

17. The system of claim 10, wherein:
the extracting of second data, and the determining of the lowest price offer are repeated at at least one predetermined instance; and
in response to the lowest price offer for the at least one predetermined instance being lower in price than a price of a preceding lowest price offer, repeating the generating of the fourth data and transmitting of the fourth data to the mobile device.

18. A computer-implemented method, comprising:
receiving, via a text messaging channel of a telecommunications network, first data from a mobile device, the first data including one or more identifiers associated with a product;
determining an identification of the product based on the first data;
providing the identification of the product to an application programming interface ("API") of an offer finder system, the offer finder system configured to:
   determine one or more products that match the identification based on (i) product identification numbers associated with the one or more products, (ii) parameters of the one or more products, and (iii) social information data associated with the one or more products, wherein the social information data includes:
      a price for at least one fulfilled offer for a product matching the identification by a user unassociated with the mobile device; and
      respective second data configured to enable access to the at least one fulfilled offer; and
   identify, over an electronic network, one or more offers for sale of the one or more products that match the identification of the product from one or more vendors;
extracting third data from the one or more identified offers that includes a respective price for each offer and respective second data configured to enable access to each offer over the electronic network;
determining a lowest price offer from amongst the one or more identified offers based on the third data;
dynamically generating a website page configured to display information associated with one or more of the third data and the lowest price offer;
generating fourth data that includes one or more of: (i) information indicative of the lowest price offer, (ii) a selectable uniform resource locator ("URL") associated with the dynamically generated website page or (iii) at least a portion of the third data having the second data corresponding to the lowest price offer; and
transmitting the fourth data to the mobile device via the text messaging channel.

* * * * *